United States Patent
Israel

(10) Patent No.: US 11,080,837 B2
(45) Date of Patent: Aug. 3, 2021

(54) ARCHITECTURE FOR IMPROVED MACHINE LEARNING OPERATION

(71) Applicant: Raytheon Company, Waltham, MA (US)

(72) Inventor: Steven A. Israel, Fairfax, VA (US)

(73) Assignee: Raytheon Company, Waltham, MA (US)

(*) Notice: Subject to any disclaimer, the term of this patent is extended or adjusted under 35 U.S.C. 154(b) by 84 days.

(21) Appl. No.: 16/506,218

(22) Filed: Jul. 9, 2019

(65) Prior Publication Data

US 2021/0012477 A1    Jan. 14, 2021

(51) Int. Cl.
*G06K 9/62* (2006.01)
*G06T 7/00* (2017.01)

(52) U.S. Cl.
CPC ............ *G06T 7/0002* (2013.01); *G06K 9/623* (2013.01); *G06K 9/6256* (2013.01); *G06T 2207/20081* (2013.01); *G06T 2207/20084* (2013.01); *G06T 2207/30168* (2013.01)

(58) Field of Classification Search
CPC ......... G06T 7/0002; G06T 2207/20081; G06T 2207/20084; G06T 2207/30168; G06K 9/623; G06K 9/6256
See application file for complete search history.

(56) References Cited

U.S. PATENT DOCUMENTS

| | | | | |
|---|---|---|---|---|
| 10,846,552 | B1* | 11/2020 | Wu | G06F 16/583 |
| 2014/0267381 | A1* | 9/2014 | Young | H04N 17/004 345/619 |
| 2019/0147301 | A1* | 5/2019 | Farfade | G06K 9/6297 382/118 |
| 2019/0294703 | A1* | 9/2019 | Bolin | G06N 3/08 |

OTHER PUBLICATIONS

Gutchess, Daniel, et al., "Predicting the Effectiveness of SAR Imagery for Target Detection", Proceedings of SPIE vol. 8051, [Online]. Retrieved from the Internet: <URL: https://www.spiedigitallibrary.org/conference-proceedings-of-spie on Feb. 26, 2019>, (2011), Jan. 2012.

Reulke, Ralf, et al., "Image Quality and Image Resolution", Seventh International Conference on Sensing Technology, (2013), 686-689.

* cited by examiner

*Primary Examiner* — Xin Jia
(74) *Attorney, Agent, or Firm* — Schwegman Lundberg & Woessner, P.A.

(57) ABSTRACT

Discussed herein are architectures and techniques for improving execution or training of machine learning techniques. A method can include receiving a request for image data, the request indicating an analysis task to be performed using the requested image data, determining a minimum image quality score for performing the analysis task, issuing a request for image data associated with an image quality at last equal to, or greater than, the determined minimum image quality score, receiving, in response to the request, image data with an image quality score greater than, or equal to, the determined minimum image quality score, and providing the received image data to (a) a machine learning (ML) model executor to perform the image analysis task or (b) an ML model trainer that trains the ML model to perform the image analysis task.

20 Claims, 3 Drawing Sheets

ARCHITECTURE FOR IMPROVED MACHINE LEARNING OPERATION

BACKGROUND

The National Imagery Interpretation Rating Scale (NIIRS) is graded from 0 to 9, where 0 is the coarsest resolution and 9 is the finest resolution. The NIIRS was developed using human perception of image quality to perform imagery analysis tasks. The image quality is determined based on one or more attributes of the image. The imagery attributes are the physical characteristics of the image such as the resolution, the relative edge response, and signal-to-noise. The analysis tasks can include, for example, determining whether a door is open or closed, identifying a type of automobile, distinguishing individual steps, or identifying grill detail or a license plate number on a license plate of a vehicle.

DETAILED DESCRIPTION

Figure 1:
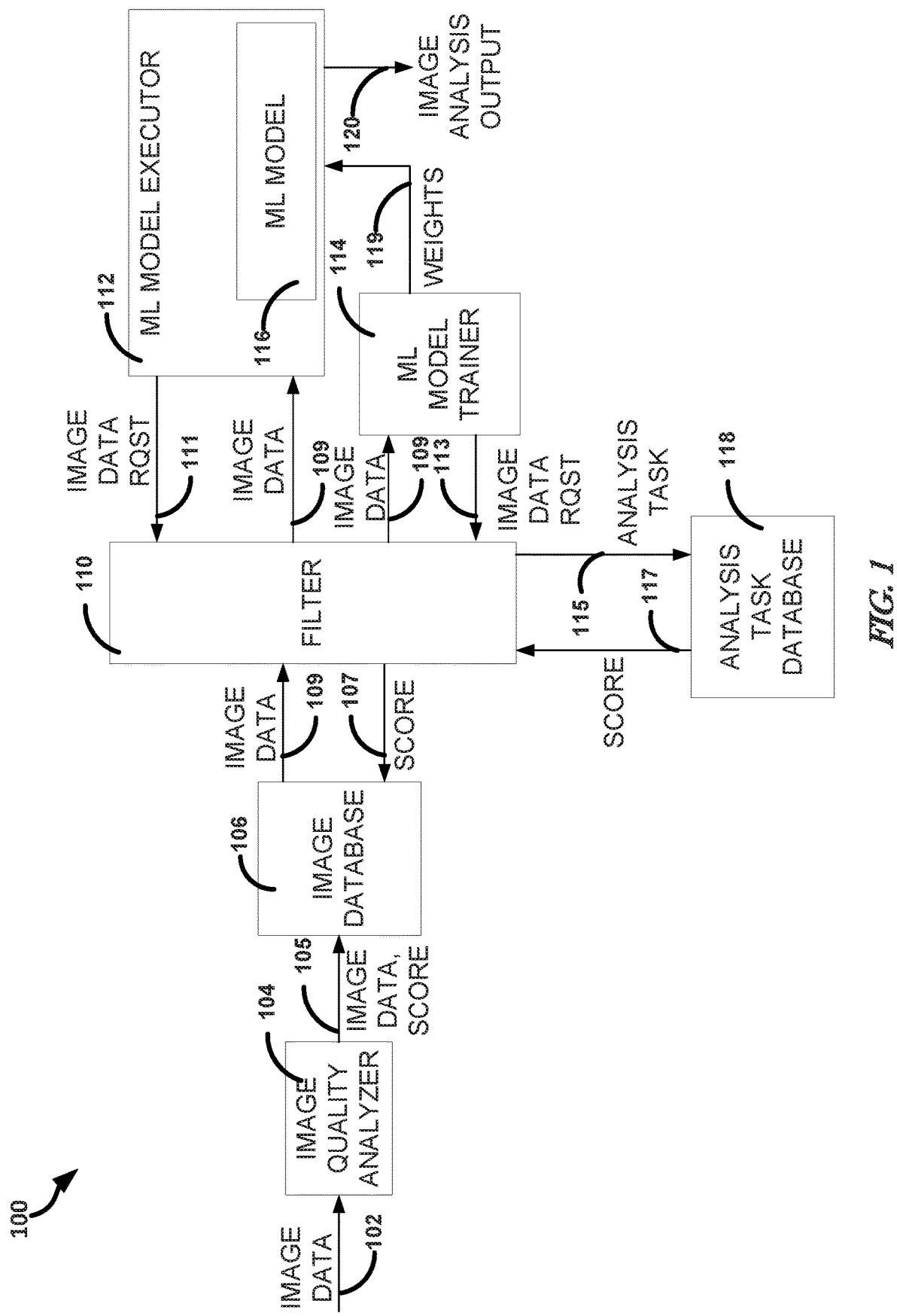
FIG. 1 illustrates, by way of example, a diagram of an embodiment of a system for improving a machine learning (ML) technique.

Some embodiments relate to automatically identifying an image quality. The image quality that is automatically identified can be used to remove images of insufficient quality for a specified purpose. For example, training a ML target model with images below the quality for the specific recognition task will generate poorly performing models regardless of training set volume. Likewise, inferencing images of insufficient quality to perform a given task will likely lead to spurious results generated by the trained target model.

Given some quantitative image quality metrics (e.g., resolution, signal to noise ratio (SNR), or the like) a NIIRS value can be predicted using the a general image quality equation (GIQE). The analysis tasks possible using the image can be determined using a National Imagery Interpretability Rating Scale (NIIRS). NIIRS is a subjective scale used for rating the quality of imagery acquired from various types of imaging systems. The NIIRS was developed using a large number of trained imagery analysts. Individual NIIRS have been developed for visible band images, radar images, infrared images, and multispectral images. With NIIRS, analysis tasks are associated with a minimum image quality required to perform the analysis task.

Automatically determining the quality of an image can include using object recognition technology, sometimes a convolutional neural network (CNN). Since the NIIRS is a subjective scale that defines quality of imagery based on objects that are distinguishable in the image, an object recognition technique (or multiple object recognition techniques) can be used to determine the quality. The following table summarizes the rating using a NIIRS rating scale on visible imagery. Sometimes, sufficient information to determine the GIQE rating for a image is provided with the image, such as part of a header (sometimes called metadata) of the image.

TABLE I

| NURS Visible Imagery Rating | Analysis Task |
|---|---|
| | short summary of visible NIIRS |
| 0 | not possible because image is obscurated, degraded, or poor resolution |
| 1 | identify port facility, or distinguish between taxi-ways and runways |
| 2 | identify hangers at airfield, static radars, military training areas, SA-5 site, warehouse, construction hall, hospital, factory, or the like |
| 3 | identify wing configuration of aircraft, radar and guidance at a SAM site, helipad, presence/absence of a support vehicle, large surface ship, trains or rolling stock (not individual cars) |
| 4 | identify fighter planes by type, individual radar antennas, vehicle type, field artillery type, open missile silo door, shape of bow on submarine, individual tracks, rail pairs, control towers |
| 5 | distinguish between MIDAS and CANDID, identify radar as vehicle or trailer-mounted, identify type of deployed tactical SSM system |
| 6 | distinguish between models of helicopters, identify shape of antenna on radar, spare tire, launcher cover, automobile as sedan or station wagon, distinguish between missile airframes |
| 7 | identify fitment or fairing on aircraft, port, ladder, vent on vehicle, mount for missile, detail of hinging mechanism, individual rail ties |
| 8 | identify rivet lines, hand-held SAM, joint, weld, wind cable on crane, windshield wiper on vehicle, license plate |
| 9 | distinguish cross-slot from single slot heads on skin panel fastener, identify small light-toned insulator of antenna canopy, vehicle registration number, screw or bolt, braid of rope, individual spike in railroad tie, license plate number |

At least two problems face the US image collection community: (a) the systems used for image collection are manual or rely on fixed rules to make collection decisions; and (b) the systems are oversubscribed and require a method for prioritizing collection requests. Often, an artificial satellite constellation contains a significant number of platforms with one or more image collection sensors on each. To simplify a collection request, requestors will ask for a specific product, such as an image with a specific ground sample distance (GSD), instead of a piece of information. The result is a reduced information yield as most requests can be accomplished using a variety of sensor, platform, and timing variations that can be included within a common ranking function.

The problems can be partially solved by building a Multi-Int Mediator (MIM). MIM is capable of performing tipping and schedule planning. However, if a product for a specific modality is explicitly called for within the collection request, MIM has no means to suggest a different collection modality. For example, if an electro-optical (EO) NIIRS Level 5 image is requested, MIM has no mechanism to complete that request with synthetic aperture radar (SAR), hyperspectral, or Lidar sensors, or the like. The focus on collection requests to use specific products, rather than information need, reduces the overall intelligence yield of the collection system. To maximize the constellation's intelligence yield, a reversible process can be helpful where the information request contains a description of how the collection will be exploited.

In some cases, a collection quality of a sensor can be predicted based upon a relative position of the platform on which the sensor resides to the target of interest. The problem has been solved for individual imaging sensors by matching human perception of image quality and analysis tasks (e.g., NIIRS and the GIQE were developed to extract image features to calculate quality). NIIRS is based upon human perception. Embodiments herein can update a task analysis process by replacing the human with ML determination of image quality.

Embodiments can include (a) collecting a wide array of images across sensors, quality, and content; (b) classifying images manually into a scale (e.g., [0, 9], [0, 99], [0, 999], a smaller or larger range, or a range therebetween); (c) identify an array of analysis tasks to be performed on the images; (d) determine whether the analysis tasks can be performed on the image using multiple analysts; (e) use analysis tasks with close to an equal space along an image quality line to form the image quality levels; (f) generate an equation for image quality using extracted image features to map the image quality to analysis task position on the quality scale; (g) use an ML technique to identify the quality of the image; (h) provide only images sufficient for the analysis task in response to a request for an image for a specified purpose. The provided image can be agnostic to type in some embodiments.

In some embodiments, image quality can be determined using Equation 1, sometimes called a GIQE:

$$\text{Image Quality} = C0 + C1 * \log_{10}(\text{GSD}) + C2 * \log_{10}(\text{RER}) + C3 * G/\text{SNR} + C4 * H$$

Where GSD is ground sample distance; RER is Relative edge response; G is noise gain due to sharpening; SNR is Signal to noise ratio; and H is height of the edge overshoot due to sharpening (e.g., from the Gibbs paradox). The constants (C0, C1, C2, C3, and C4) can change or remain the same for values of the GSD, RER, G, SNR, or H. For example, one or more of the constants can be a first value for RER≥0.9 and another value for RER<0.9.

The Gibbs paradox is an entropy paradox encountered in mechanics in which the entropy of a closed system can decrease, thus violating the second law of thermodynamics. Each of the RER and H can be determined based on a geometric mean, or other average, of the image data. This image quality rating scale is based upon a regression of the criteria and their associated minimum quality. The scale is 10 steps, 0 to 9.

Examples of image analysis tasks are numerous, too numerous to cite all them here. Examples of image analysis tasks include all of those things detailed in Table 1 and further include identifying automobiles as sedans or station wagons, determining whether a door is open or closed, identifying a person by their face, assay reading, calculating the size of a planet, error level analysis, filtering, machine vision, identifying a defect in a part, detecting cancer or other ailment in tissue, determining mineral content of sediment or a rock, counting germs in a medium (e.g., Petri dish, swab, tissue, or the like), remote sensing (e.g., detecting an intruder, producing land use map, or the like), object avoidance, detecting an eye color, hair color, or color of another object, among many others.

Embodiments provide improvements by ensuring images of only a sufficient quality are provided to perform a task. Using only images of sufficient quality leads to improvements in the ML models that are trained to perform the image analysis. By training only on images that are of sufficient quality to perform the image analysis task the classification error is lowered and the task is performed at a higher rate of success, thus reducing resource congestion. Embodiments provide these improvements by one or more of removing a human from the determination of image quality, filtering images to only those of sufficient quality to perform the analysis task, training the ML model on only those images of sufficient quality (as determined by an ML model), or classifying an analysis task using an ML model trained on images of sufficient quality.

FIG. 1 illustrates, by way of example, a diagram of an embodiment of a system 100 for improving an ML technique. The system 100 as illustrated includes image data 102 as input to an image quality analyzer 104, an image database 106, a data filter 110, an ML model executor 112, an ML model trainer 114, an ML model 116, and an analysis task database 118.

The image data 102 can include data that is viewable in an image format. Examples of such data include, for example, pixel values of a color image, grayscale image, infrared image, thermal image, synthetic aperture radar (SAR) image, radar image, synthetic aperture sonar (SAS) image, a three-dimensional (3D) point cloud, topological map, audio data represented using spectrograms, sensor measurements, or other data represented in the form of an image.

The image quality analyzer 104 includes processing circuitry to determine an image score for the image data 102. The image score can be determined in accord with Equation 1, in some embodiments. Other image quality scores are within the scope of this disclosure. To determine the image quality score for the image data 102 using Equation 1, the image quality analyzer 104 determines GSD, RER, G, SNR, and H.

GSD is the distance between pixel centers measured on the ground. Semivariogram and wavelet analysis can be used to determine GSD. A simple GSD calculation is provided in Equation 2:

$$\text{GSD} = \text{Pixel Size} * \text{Distance to Object}/\text{Focal Length}$$

RER is an indication of how distinct an outline of an object appears in an image. RER is a normalized edge spread function. The lower the relative edge response, the harder it is to discern the edges of the object. GSD in combination with RER informs on how pixelated an image is. The higher the GSD and the higher the RER, the more pixelated an image becomes. The lower the RER, however, the more indistinct the boundaries between objects.

G is noise gain due to sharpening. Unlike old time analog photography, digital images can be enhanced using digital enhancements for edge and intensity sharpening. G is a measure of the noise generated from this enhancement process.

SNR is a measure of the sensitivity of an imaging system. SNR values over 30 dB indicate excellent image quality and SNR values around 20 dB indicate acceptable image quality. SNR can be determined as the mean value of the signal divided by the standard deviation of the signal or the standard deviation of a background signal. Alternatively, the SNR can be determined as the signal divided by the root mean square of noise.

H is height of the edge overshoot due to sharpening. The edge overshoot is an effect of spatial edge sharpening.

The image quality analyzer 104 can perform a deterministic technique (e.g., a rule-based or heuristic technique) or an ML technique to determine the image score. In doing so, the image quality analyzer 104 can determine the parameters RER, G, SNR, H, and GSD (if using the GIQE).

The database 106 stores image data 102 (or some unique identifier or link that can be used to locate the image data), image score 105. The database 106 can further store data indicating the type of image data (e.g., SAR, SAS, EO, multi-spectral, or the like). The type of image or image score can be used (e.g., by the filter 110) to determine whether the image data 102 is sufficient for the analysis to be performed by the ML model 114. An example entry in the database is provided:

{image identifier, image data, score, type, date, geographical region, number}

Some of the fields of the entry are optional, such as the type, date, and geographical region. The image identifier uniquely identifies the image data associated with the entry. The image identifier can be used to retrieve the image data from another database, such as in embodiments in which the image database 106 does not store the image data 102. The image data 102 is optional and can be stored in a device separate from (e.g., on a same or different network) the image database 106. The score is the image score as determined by the image quality analyzer 104. The type is optional and is discussed previously. The date is the date or time at which the image data was captured. The geographical region is optional and indicates, in longitude and latitude, geographical positioning system (GPS) coordinates, or the like, an area in view in the image data. A number field is optional and indicates the number of images of the specified quality that are being requested.

The filter circuitry 110 can manage requests for image data 102 from the database 106. The filter 110 can receive a request 111, 113 for image data 102. The request 111, 113 can indicate an analysis task (or multiple analysis tasks) to be performed by (a) an ML model to be trained using the image data 111, or (b) an already trained ML model, using the image data 109. The filter 110 can identify a minimum image score required to perform the analysis task. This identification can include looking up the analysis task 113 in the analysis task database 118 or issuing a query to the analysis task database 118. The analysis task database 118 can provide, in response to the query or a lookup request, an analysis score 117 associated with the analysis task 115. The analysis score 117 can be determined by a priori knowledge. In some embodiments, the analysis score 117 can include the NIIRS score or similar score for the analysis task 115. See Table 1 for a list of analysis tasks and their respective associated NIIRS scores. Note that the analysis score 117 is different than the image score generated by the image quality analyzer 104. The analysis score 117 indicates a minimum required image quality to perform an associated analysis task 115, while the image score indicates the quality of a specific image.

The filter 110 can then issue a request to the image database 106 for image data of images that have a score greater than, or equal to, the score 107. The score 107 can be equal to the score 117 provided by the analysis task database 118. The image database 106 can return a number of images that satisfy the request. In some embodiments, the image database 106 may not have sufficient images to satisfy a request. In such embodiments, the image database 106 can return image data for all images that satisfy the request 111, 113 and an indication of the number of images that are being returned.

The filter 110 can provide image data 109 with images that are sufficient for the analysis task to the ML model executor 112 or the ML model trainer 114.

The ML model trainer 114 operates to determine weights 119 of an ML model 116 to be executed by the model executor 112. The ML model trainer 114 may operate in a supervised manner, such as by predicting an output for a given input and comparing the predicted output to a known output. A loss function may indicate how to change the weights of the ML model 116 to make a better prediction on future data. The ML model trainer 114 may be configured to perform operations of the method(s) 200.

The ML model 116 operates to perform an analysis task. For example, the analysis task can include automatic target recognition (ATR), determining a state of a recognized object (e.g., whether a door is open or closed, a vehicle is moving, a silo is open, or the like), or the like. As previously discussed, the number of analysis tasks is large and the variety of analysis tasks is vast, too numerous to name here. A variety of analysis tasks is provided in Table 1 above.

One or more of the image quality analyzer 104, filter 110, ML model executor 112, and the ML model trainer 114 can be implemented using processing circuitry. The image quality analyzer 104, filter 110, ML model executor 112, and the ML model trainer 114 can be implemented on same or different devices, such as on devices of a same or different network. Processing circuitry may include one or more electric or electronic components configured to perform one or more operations of the processing circuitry. The electric or electronic components may include one or more transistors, resistors, capacitors, diodes, inductors, analog to digital converters, digital to analog converters, rectifiers, power supplies, logic gates (e.g., AND, OR, XOR, negate, buffer, or the like), switches, oscillators, modulators, demodulators, relays, antennas, phase-looked-loops, amplifiers, central processing units (CPUs), graphics processing units (GPUs), application specific integrated circuits (ASICs), field programmable gate arrays (FPGAs), or the like.

In some embodiments, the processing circuitry is part of a cloud or is provided as a service through the Internet or other network. For example, the ML trainer 114 may be implemented in the cloud, while the model executor 112 may be implemented on a different device.

The weights 119 may be provided to a memory for future access by the model executor 112. The model executor 112 may retrieve the weights 119 and implement the ML model 116 using the weights 119. The ML model 116 may perform an analysis task on the image data 102 and provide a corresponding image analysis output 120.

In some embodiments, there are three parts to an analysis task. The three parts can include an object to be detected, an optional qualifier, and a task. The object to be detected can be any object in image data. Examples of objects include roadways, runways, taxiways, vehicles, foliage, animals, people, buildings, parts thereof, or the like. The qualifier provides further clarifications (if any) on the object and task. For example, if an object is a vehicle, but it desired to only identify four door vehicles and not two door vehicles, this can be specified using the qualifier. Other examples of qualifiers include manned, unmanned, a specific color, dimension (e.g., length, height, width, etc.), shape, number, geographical location, or the like. The task can be to identify, determine, or the like. For example, the task can be to determine a length of an object or identify a vehicle as a sedan or station wagon, or the like.

Figure 2:
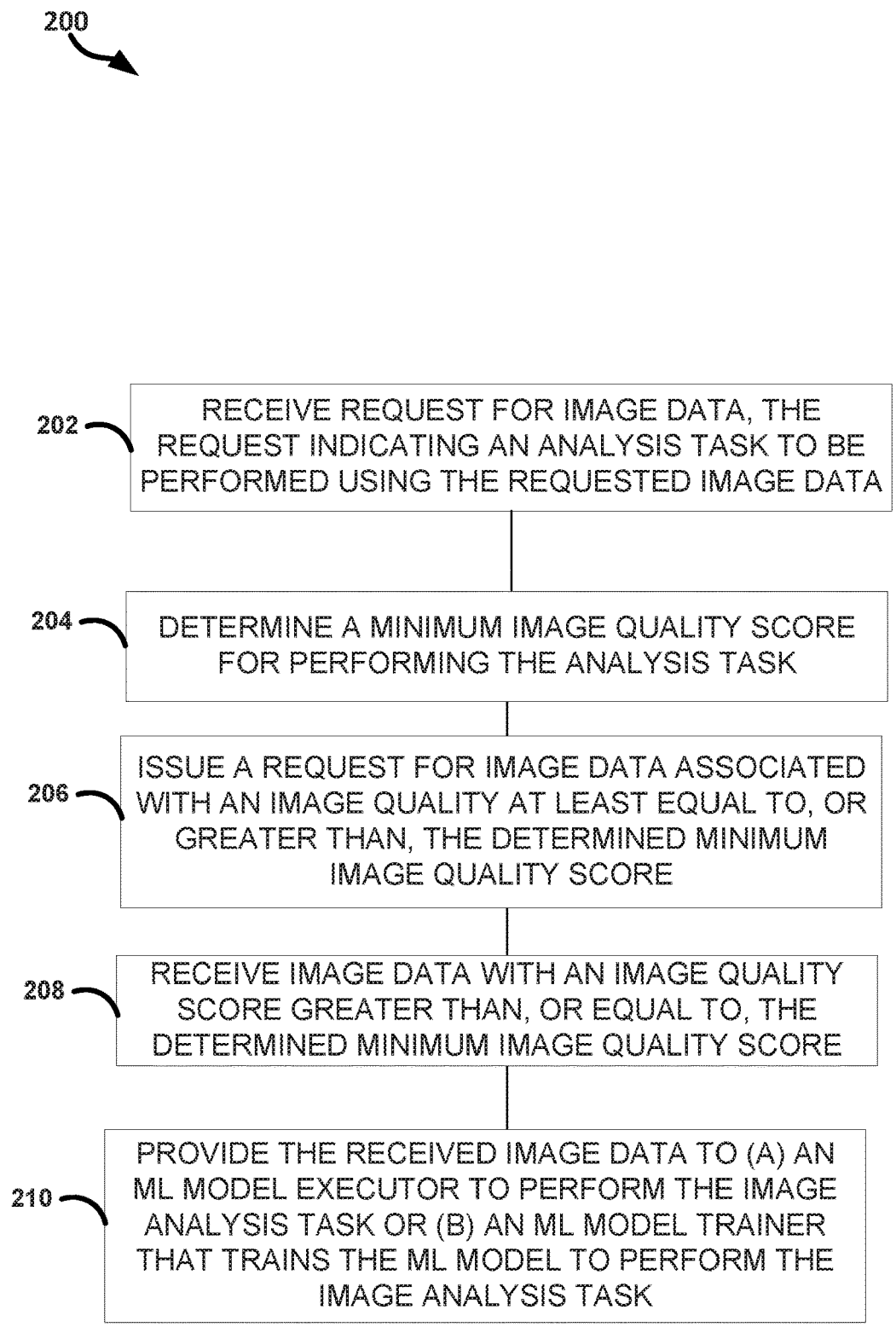
FIG. 2 illustrates, by way of example, a diagram of an embodiment of a method for improving an ML technique.

FIG. 2 illustrates, by way of example, a diagram of an embodiment of a method 200 for image processing. The method 200 as illustrated include receiving a request for image data, the request indicating an analysis task to be performed using the requested image data, at operation 202; determining a minimum image quality score for performing the analysis task, at operation 204; issuing a request for image data associated with an image quality at last equal to, or greater than, the determined minimum image quality score, at operation 206; receiving, in response to the request, image data with an image quality score greater than, or equal to, the determined minimum image quality score, at operation 208; and providing the received image data to (a) a machine learning (ML) model executor to perform the image analysis task or (b) an ML model trainer that trains the ML model to perform the image analysis task, at operation 210.

The method 200 can further include determining an image quality score for image data and cause the image quality score to be associated with an image identifier that uniquely identifies the image data in a memory. The method 200 can further include, wherein determining the image quality score includes determining a ground sample distance, a sharpness of the image, and a signal to noise ratio of the image data. The method 200 can further include, wherein the request for the image data includes a type field that specifies a type of sensor that captured the image data, a geographical location field that specified a geographical area to be present in the image data, or a number field that indicates the number of images requested. The method 200 can further include, wherein the request for the image data includes the type field and the issued request for image data does not specify the type.

The method 200 can further include, wherein determining the minimum image quality score includes issuing a query to a database based on the analysis task or looking up the analysis task in a table that details the minimum image quality score. The method 200 can further include, wherein the analysis task is for automatic target recognition and the issued request for the image data specifies a target that indicates an object to be detected, a task that indicates an operation to be performed by the ML model, and a qualifier that restricts the objects to be detected by the ML model to a proper subset.

As human and computational cues for image interpretation are different, the parameters associated with a GIQE are expected to be different. Each image modality (e.g., SAR, EO, IR, etc.) has a nearly unique set of criteria, yet previously it was not suitable to propagate an analysis task request to a sensor of a different modality. This was compounded by a subjective determination of the quality score based on a determination by imagery analysts. Current state-of-the-art (SOTA) employs automated initial processing with analyst adjudication.

This invention adapts the human perception based NIIRS process to ML and can propagate criteria across multiple imaging modalities. The strategy takes advantage that ML task analysis has become more consistent across developers, which equates to the agreement required for scale development. The system consists of the 2 basic tracks described above. The first track is of criteria development. The second track collects images across the quality and sensor spectrums. Finally, the images and criteria are both used to identify the image parameters that map to the GIQE and to the NIIRS for each modality.

An advantage can include (a) updating the NIIRS-GIQE from human perception to ML; (b) propagating criteria across all the modalities to enable increased intelligence yield and quantifiable collection request rank; (c) enables an automated closed loop collection and analysis; (d) an automated system generates more of it products having relevant outputs, since it can filter image ingest based upon a common quality; (e) changes a collection analysts concept of operations (CONOPs) from specific products to information need criteria; (f) enabling collection requests to be ranked quantitatively and more efficiently exploit the capacity of an entire constellation of sensors and platforms; and (g) being fully digital, image associated data can be updated to include new criteria. Part of the skepticism about ML techniques is that they generate decisions on any data. Often, models are fed data that are outside their operating parameters. The metadata data tagging can be used by an ingest filter to only process relevant data.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions or algorithms may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, FPGAs, ASICs, or the like).

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. Instead, a training process is used to arrive at appropriate weights. NN designers typically choose a number of neuron layers or specific connections between layers including circular connection. Instead, a training process generally proceeds by selecting initial weights, which may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of ANNs. Any well-known optimization algorithm for back propagation may be used, such as stochastic gradient descent (SGD), Adam, etc.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 3:
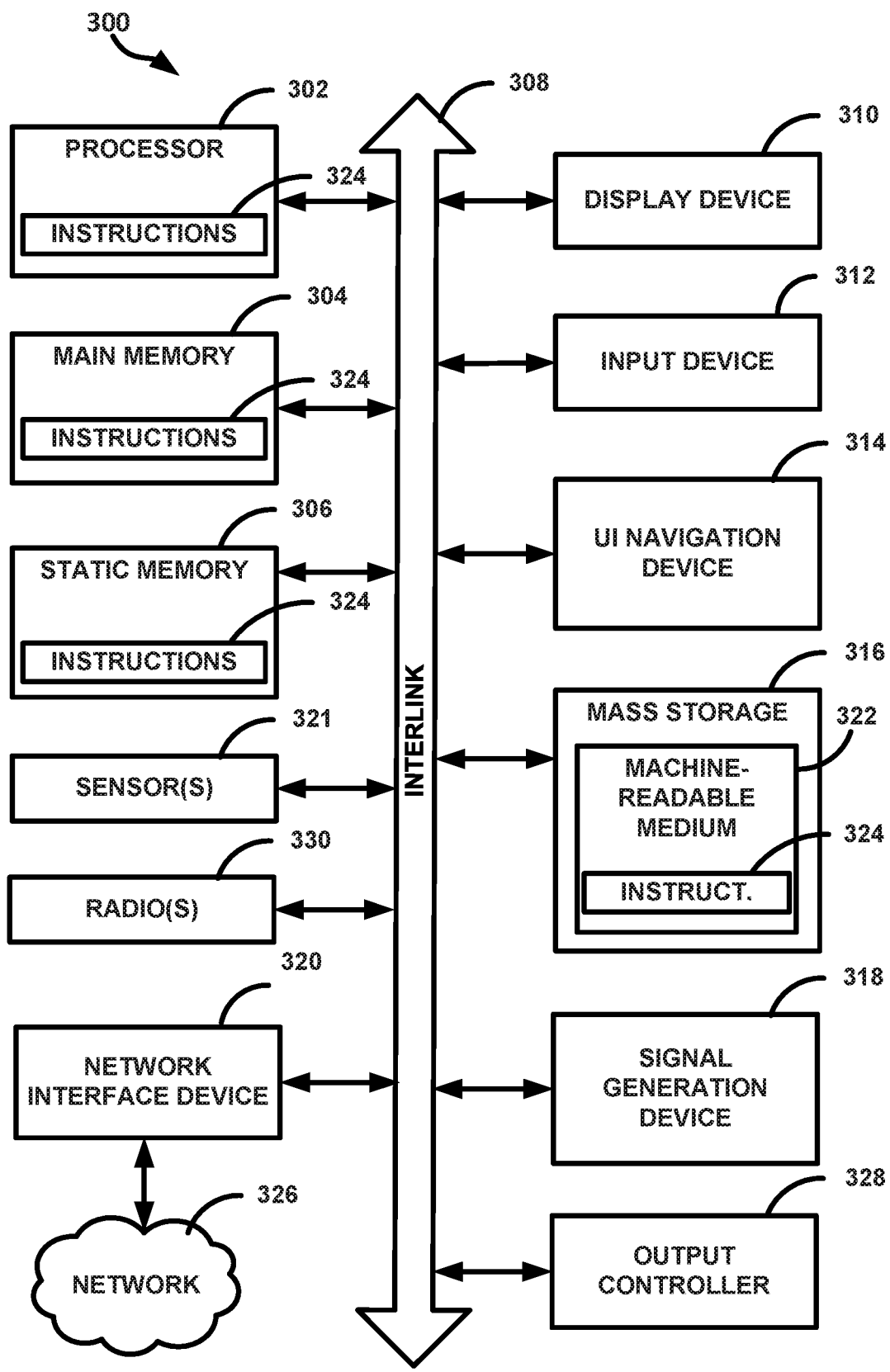
FIG. 3 illustrates, by way of example, a block diagram of an embodiment of a machine (e.g., a computer system) to implement one or more embodiments.

FIG. 3 illustrates, by way of example, a block diagram of an embodiment of a machine in the example form of a computer system 300 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. One or more of the image quality analyzer 106, filter 110, ML model trainer 114, and ML model executor 112 can include, or be implemented using, one or more of the components of the system 300.

The example computer system 300 includes a processor 302 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker), a network interface device 320, and radios 330 such as Bluetooth, WWAN, WLAN, and NFC, permitting the application of security controls on such protocols.

Machine-Readable Medium

The disk drive unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 324 may further be transmitted or received over a communications network 326 using a transmission medium. The instructions 324 may be transmitted using the network interface device 320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional notes and some illustrative Examples.

Example 1 includes a system for image processing, the system comprising a memory to store parameters defining a machine learning (ML) model, the ML model for performing an analysis task on image data, and processing circuitry to receive a request for image data, the request indicating an analysis task to be performed using the requested image data, determine a minimum image quality score for performing the analysis task, issue a request for image data associated with an image quality at last equal to, or greater than, the determined minimum image quality score, receive, in response to the request, image data with an image quality score greater than, or equal to, the determined minimum image quality score, and provide the received image data to (a) an ML model executor to perform the image analysis task or (b) an ML model trainer that trains the ML model to perform the image analysis task.

In Example 2, Example 1 further includes, wherein the processing circuitry is further to determine an image quality score for image data and cause the image quality score to be associated with an image identifier that uniquely identifies the image data in a memory.

In Example 3, Example 2 further includes, wherein determining the image quality score includes determining a ground sample distance, a sharpness of the image, and a signal to noise ratio of the image data.

In Example 4, at least one of Examples 1-3 further includes, wherein the request for the image data includes a type field that specifies a type of sensor that captured the image data, a geographical location field that specified a geographical area to be present in the image data, or a number field that indicates the number of images requested.

In Example 5, Example 4 further includes, wherein the request for the image data includes the type field and the issued request for image data does not specify the type.

In Example 6, at least one of Examples 1-5 further includes, wherein determining the minimum image quality score includes issuing a query to a database based on the analysis task or looking up the analysis task in a table that details the minimum image quality score.

In Example 7, at least one of Examples 1-6 further includes, wherein the analysis task is for automatic target recognition and the issued request for the image data specifies a target that indicates an object to be detected, a task that indicates an operation to be performed by the ML model, and a qualifier that restricts the objects to be detected by the ML model to a proper subset.

Example 8 includes a method for performing the operations of the processing circuitry of at least one of Examples 1-7.

Example 9 includes a non-transitory machine-readable medium including instructions that, when executed by a machine, cause the machine to perform operations of the processing circuitry of at least one of Examples 1-7.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for image processing, the system comprising:
a memory to store parameters defining a machine learning (ML) model, the ML model for performing an analysis of image data; and
processing circuitry to:
receive a request for image data, the request indicating an object identification task to be performed using the requested image data;
determine a minimum image quality score required for performing the object identification task;
issue a request for image data associated with an image quality score at last equal to, or greater than, the determined minimum image quality score, the image quality score determined independently for each image;
receive, in response to the request, image data with an image quality score greater than, or equal to, the determined minimum image quality score; and
provide the received image data to (a) an ML model executor to perform the image analysis task or (b) an ML model trainer that trains the ML model to perform the image analysis task.

2. The system of claim 1, wherein the processing circuitry is further to:
determine an image quality score for the image data;
cause the image quality score to be associated with an image identifier that uniquely identifies the image data in a memory; and
provide only images with an associated image quality score greater than the determined minimum image quality score to the ML model executor or the ML model trainer.

3. The system of claim 2, wherein determining the image quality score includes determining a ground sample distance, a sharpness of the image, and a signal to noise ratio of the image data.

4. The system of claim 1, wherein the request for the image data includes a type field that specifies a type of sensor that captured the image data, a geographical location field that specified a geographical area to be present in the image data, or a number field that indicates the number of images requested.

5. The system of claim 4, wherein the request for the image data includes the type field and the issued request for image data does not specify the type.

6. The system of claim 1, wherein determining the minimum image quality score includes issuing a query to a database based on the object identification task or looking up the analysis task in a table that details the minimum image quality score for the object identification task.

7. The system of claim 1, wherein the object identification task is for automatic target recognition and the issued request for the image data specifies a target that indicates an object to be detected, a task that indicates an operation to be performed by the ML model, and a qualifier that restricts the objects to be detected by the ML model to a proper subset.

8. A method for image processing, the method comprising:
    receiving a request for image data, the request indicating an object identification task to be performed using the requested image data;
    determining a minimum image quality score for performing the object identification task;
    issuing a request for image data associated with an image quality at last equal to, or greater than, the determined minimum image quality score;
    receiving, in response to the request, image data with an image quality score greater than, or equal to, the determined minimum image quality score; and
    providing the received image data to (a) a machine learning (ML) model executor to perform the object identification task or (b) an ML model trainer that trains the ML model to perform the object identification task.

9. The method of claim 8 further comprising:
    determining an image quality score for image data;
    causing the image quality score to be associated with an image identifier that uniquely identifies the image data in a memory; and
    provide only images with an associated image quality score greater than the determined minimum image quality score to the ML model executor or the ML model trainer.

10. The method of claim 9, wherein determining the image quality score includes determining a ground sample distance, a sharpness of the image, and a signal to noise ratio of the image data.

11. The method of claim 8, wherein the request for the image data includes a type field that specifies a type of sensor that captured the image data, a geographical location field that specified a geographical area to be present in the image data, or a number field that indicates the number of images requested.

12. The method of claim 11, wherein the request for the image data includes the type field and the issued request for image data does not specify the type.

13. The method of claim 8, wherein determining the minimum image quality score includes issuing a query to a database based on the object identification task or looking up the object identification task in a table that details the minimum image quality score.

14. The method of claim 8, wherein the object identification task is for automatic target recognition and the issued request for the image data specifies a target that indicates an object to be detected, a task that indicates an operation to be performed by the ML model, and a qualifier that restricts the objects to be detected by the ML model to a proper subset.

15. A non-transitory machine-readable medium including instructions that, when executed by a machine, cause the machine to perform operations for image processing, the operations comprising:
    receiving a request for image data, the request indicating an object identification task to be performed using the requested image data;
    determining a minimum image quality score for performing the object identification task;
    issuing a request for image data associated with an image quality at last equal to, or greater than, the determined minimum image quality score;
    receiving, in response to the request, image data with an image quality score greater than, or equal to, the determined minimum image quality score; and
    providing the received image data to (a) a machine learning (ML) model executor to perform the object identification task or (b) an ML model trainer that trains the ML model to perform the object identification task.

16. The non-transitory machine-readable medium of claim 15, wherein the operations further comprise;
    determining an image quality score for image data;
    causing the image quality score to be associated with an image identifier that uniquely identifies the image data in a memory; and
    providing only images with an associated image quality score greater than the determined minimum image quality score to the ML model executor or the ML model trainer.

17. The non-transitory machine-readable medium of claim 16, wherein determining the image quality score includes determining a ground sample distance, a sharpness of the image, and a signal to noise ratio of the image data.

18. The non-transitory machine-readable medium of claim 15, wherein the request for the image data includes a type field that specifies a type of sensor that captured the image data, a geographical location field that specified a geographical area to be present in the image data, or a number field that indicates the number of images requested.

19. The non-transitory machine-readable medium of claim 18, wherein the request for the image data includes the type field and the issued request for image data does not specify the type.

20. The non-transitory machine-readable medium of claim 15, wherein determining the minimum image quality score includes issuing a query to a database based on the object identification task or looking up the object identification task in a table that details the minimum image quality score.

\* \* \* \* \*

UNITED STATES PATENT AND TRADEMARK OFFICE
CERTIFICATE OF CORRECTION

PATENT NO. : 11,080,837 B2  
APPLICATION NO. : 16/506218  
DATED : August 3, 2021  
INVENTOR(S) : Steven A. Israel Page 1 of 1

It is certified that error appears in the above-identified patent and that said Letters Patent is hereby corrected as shown below:

In the Specification

In Column 2, Line 4, delete "NURS" and insert --NIIRS-- therefor

In Column 5, Line 3, delete "114." and insert --116.-- therefor

In Column 5, Line 29, delete "111," and insert --102,-- therefor

In Column 5, Line 32, delete "113" and insert --115-- therefor

In Column 12, Line 3, delete "106," and insert --104,-- therefor

Signed and Sealed this  
Twenty-second Day of February, 2022

Drew Hirshfeld  
*Performing the Functions and Duties of the  
Under Secretary of Commerce for Intellectual Property and  
Director of the United States Patent and Trademark Office*